US00RE38032E

(19) United States
(12) Reissued Patent
Butwin

(10) Patent Number: US RE38,032 E
(45) Date of Reissued Patent: Mar. 18, 2003

(54) LAYOUT TOOL FOR LAYING OUT PERPENDICULAR LINES

(76) Inventor: Robert S. Butwin, 31 Stone Fence Rd., Allendale, NJ (US) 07401

(21) Appl. No.: 09/727,353

(22) Filed: Nov. 30, 2000

Related U.S. Patent Documents

Reissue of:
(64) Patent No.: 5,974,677
Issued: Nov. 2, 1999
Appl. No.: 09/055,109
Filed: Apr. 3, 1998

U.S. Applications:
(63) Continuation-in-part of application No. 08/847,329, filed on Apr. 23, 1997, now abandoned, and application No. 08/937,320, filed on Aug. 13, 1997, now abandoned.

(51) Int. Cl.[7] ..... B43L 7/10
(52) U.S. Cl. ..... 33/463; 33/460; 33/464
(58) Field of Search ..... 33/463, 456, 460, 33/452, 453, 459, 464

(56) References Cited

U.S. PATENT DOCUMENTS

| | | | | | |
|---|---|---|---|---|---|
| 124,222 | A | | 3/1872 | Scott | 33/463 |
| 778,659 | A | | 12/1904 | Guth | 33/463 |
| 1,209,855 | A | | 12/1916 | Follette | 33/463 |
| 1,394,088 | A | | 10/1921 | Heller | |
| 2,667,697 | A | | 2/1954 | McGrath | 33/463 |
| 3,345,750 | A | | 10/1967 | Hill | |
| 4,955,141 | A | | 9/1990 | Welch | 33/418 |
| 5,384,967 | A | * | 1/1995 | Helmuth | 33/463 |
| 5,414,938 | A | | 5/1995 | Meek | 33/452 |
| 5,974,677 | A | * | 11/1999 | Butwin | 33/463 |
| 6,334,261 | B1 | * | 1/2002 | Scillia et al. | 33/463 |

* cited by examiner

*Primary Examiner*—Christopher W. Fulton
(74) *Attorney, Agent, or Firm*—Kenyon & Kenyon

(57) ABSTRACT

The layout instrument or tool of this invention includes a pair of members arranged together to form an "L" at a right angle. The unique feature of this arrangement is that the two opposing ends of the "L" are also affixed to another member changing the shape from an "L" to the shape of a 3-4-5 triangle. All members of the instrument are permanently attached, therefore, misalignment is avoided and accuracy is assured and maintained. The two members are configured to slide with respect to one another at the pivot point of the "L" and simply pivot at their opposite ends about their pivot points connecting the third member and creating an enclosed triangle. A spring loaded rivet mounted in one of the "L" members slides in a skewed slot in the adjacent member to open the triangle from a closed position where the three sides or members of the triangle are substantially parallel to one another. The rivet locks in a semi-circular aperture which maintains the tool in a proper locking position even if the rear portion of the semi-circle becomes distorted from the repeated use.

23 Claims, 3 Drawing Sheets

LAYOUT TOOL FOR LAYING OUT PERPENDICULAR LINES

Matter enclosed in heavy brackets [ ] appears in the original patent but forms no part of this reissue specification; matter printed in italics indicates the additions made by reissue.

BACKGROUND OF THE INVENTION

This application is *a reissue application of U.S. Pat. No. 5,974,677, issuing from application Ser. No. 09/055,109, filed Apr. 3, 1998, which is a continuation-in-part of application Ser. No. 08/847,329, filed Apr. 23, 1997, now abandoned and* a continuation-in-part of application Ser. No. 08/937,320 filed Aug. 13, 1997 now abandoned.

The proposed invention referred to herein as A SQUARE™, was conceived during many years of applying the theory of a 3-4-5 triangle during the practice of laying out perpendicular lines in the construction industry. Creating a perpendicular line, which is any substantial length (approximately 4' or greater) requires greater accuracy than a framing square can provide due to its size. It is this need for accuracy that dictates the use of a 3-4-5 triangle using the present invention.

Typical application of the 3-4-5 triangle, prior to this, invention, comprised using two tape measures simultaneously, which required two people to perform the operation with any efficiency. A SQUARE™ is a tool which creates 3-4-5 rigid triangle. Advantageously, the tool folds to a compact state with the sides of the triangle aligned to allow it to be portable and storable. The invention has a wide range of uses in the construction industry for many types of lay out, i.e., framing lay out, masonry lay out, concrete form work, finish carpentry, cabinet installation, construction supervision, ceramic tile layout, VCT tile lay out, etc. Furthermore, the design of A SQUARE™ gives it the ability to function as a proficient sheet rock square by resting the three foot leg on the ground rather than the traditional sheet rock square which hangs from the board. The invention may also be produced in a variety of sizes and configurations for example, an isosceles triangle.

Among the prior art patents of general interest are U.S. Pat. Nos. [124,22] *124,222* ; 778,659; 1,394,088; 2,667,697; 3,345,750 and 4,955,141. The prior art patents are not directly [in] *on* point and fail to provide an anticipation of the features which have made this invention a great success.

SUMMARY OF THE INVENTION

This invention relates to layout tools and particularly to tools providing a right angle for laying out perpendicular lines of any substantial length. The invention comprises three legs or members, all of which are permanently attached at pivot points. Two of the three points are precisely located pivot points. The third point is a precisely located resilient locking stud or rivet which slides in a skewed slot and permits the adjoining two members to slide into a parallel plane to one another in a compact folded position when not in use and then into a locked open position creating a perfect 3-4-5 triangle for layout purposes when in use. Critical to the design is the fact that the manner in which the members are connected and aligned guarantees a perfect and not distorted 3-4-5 triangle. This is crucial to maintain the accuracy of the tool.

Accordingly, an object of this invention is to provide a new and improved layout tool which provides a right angle.

Another object of this invention is to provide a new and improved layout tool which includes a 3-4-5 triangle to provide an accurate 90° angle for layout purposes.

A further object of this invention is to provide a new and improved layout tool involving a relatively large 3-4-5 triangle which readily slides into a compact form with the legs of the triangle in a substantially parallel plane.

A more specific object of this invention is to provide a triangular right angle layout tool for laying out perpendicular lines wherein the legs are pivotally mounted to one another at their ends and one end includes a spring-loaded rivet which slides in a skewed slot in an adjacent leg to collapse the triangle into linearly parallel legs.

BRIEF DESCRIPTION OF THE DRAWINGS

The above and other objects and advantages of this invention may be more clearly seen when viewed in conjunction with the accompanying drawings wherein.

FIG. [5] *6* is a top plan view of an alternative embodiment of the invention in an [unlocked] *open* position depicting the overall footprint of the layout tool in an unfolded isosceles triangular arrangement.

DETAILED DESCRIPTION OF THE INVENTION

Figure 1:
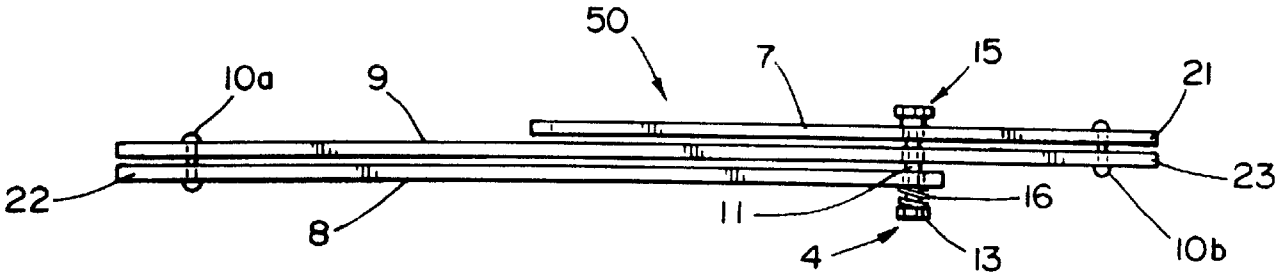
FIG. 1 is an elevation side-view with the invention in a closed position depicting the stacking arrangement of the members or triangle legs and the pivot point mountings.

Referring now to the drawings, the invention comprises three rigid elongated members of flat stock 7, 8 and 9 made of light weight material such as aluminum, fiberglass, plastic, composite material, etc forming a lay out tool 50. The members or legs 7, 8 and 9 are permanently fastened together at pivots 10a and 10b in such a manner which allows them to be folded with all three members 7, 8 and 9 parallel to each other as shown in FIG. 1. The long edges 21, 22 and 23 are aligned in a stacked formation, forming the profile of a single member in a top view. This facilitates carrying and storage of the tool 50.

When folded, the tool 50 of the invention comprises three members 7, 8 and 9 stacked together with the thin edges 21, 22 and 23 of the rectangular profiles aligned. In the folded position, the tool 50 will be held closed by means of tension generated by the locking mechanism 4 which includes pin 11 and spring 16 with the spring loaded push button head 13 and the enlarged washer 15 affixed to the other end of the pin or rivet 11. The tool 50 is thus kept in this position and prevented from falling open on its own. Approximately six pounds of pressure is required to disengage the lock and compress the spring 16. The intermediate portion 11 of the locking mechanism 4 engages the notch 30 in the leg 9 to limit the movement of leg 7 during folding.

Figure 2:
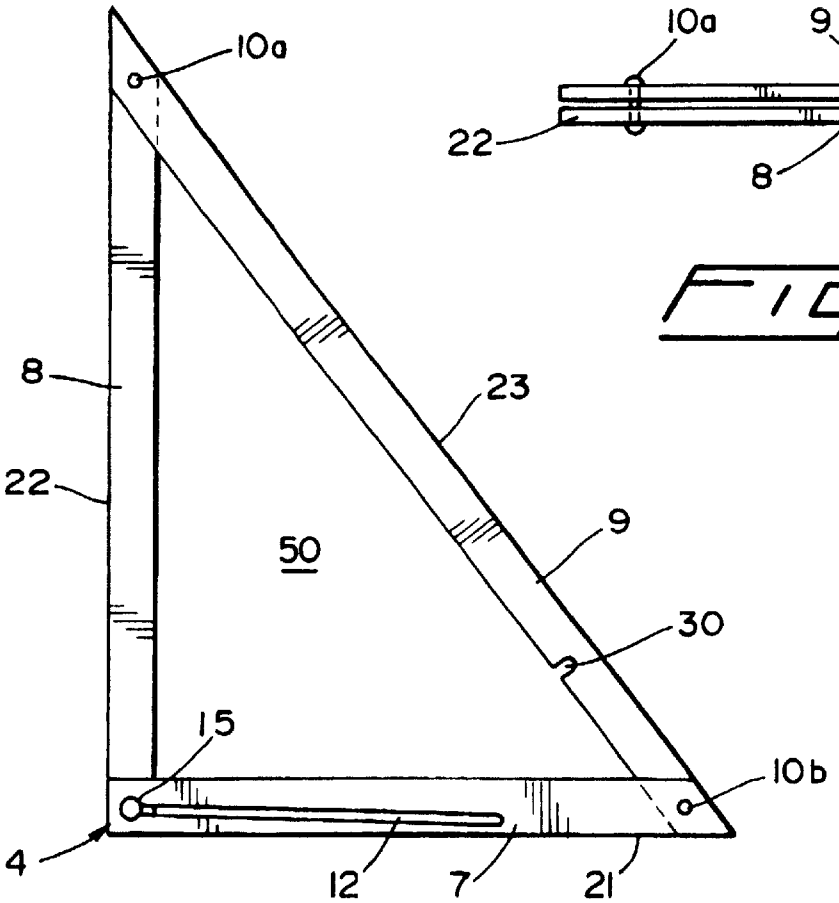
FIG. 2 is a top plan view of the invention in an [unlocked] *open* position depicting the overall footprint of the layout tool in an unfolded triangular arrangement.
Figure 4A:
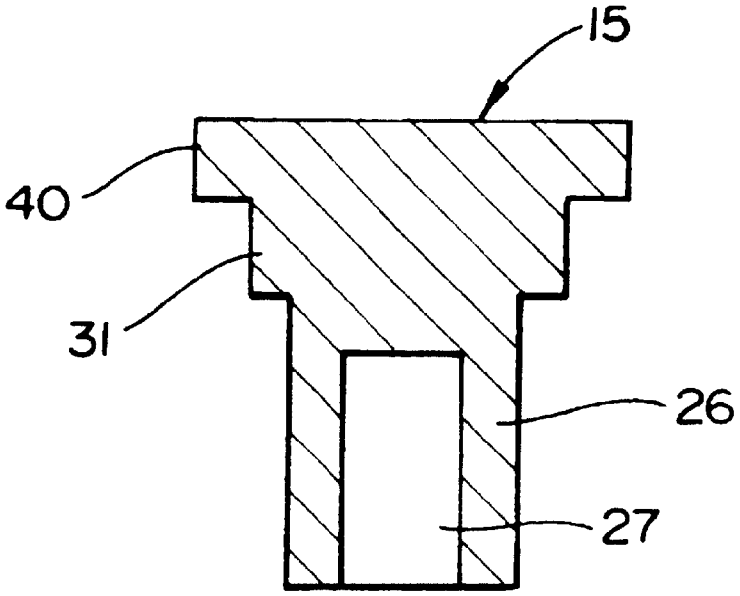
FIG. 4b shows the internal portion of the rivet with the push button head.
Figure 4B:
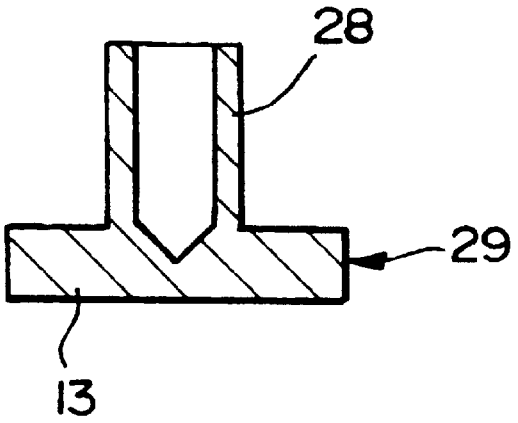

In the open position shown in FIG. 2, the tool 50 will form a right angle at the intersection of two of the members legs 7 and 8, and the other two ends will be joined by a diagonal leg 9. In the preferred embodiment, the dimensions of the legs will be three feet-leg 7, four-feet leg 8 and five feet-leg 9.

The tool 50 creates and guarantees a perfect right angle by design, employing the mathematic ratio of a 3-4-5 triangle.

By design, the tool 50 will retain its accuracy due to the fact that each of the three members 7, 8 and 9 are continuously attached to one another. This maintains the integrity of the tool 50. Two of the attachment points are precisely located rivet pivot points 10a and 10b. The third point is a pin or rivet 11 with a push button head 13 at one end and an enlarged washer 15 affixed to the other end engaging the surface of leg 7 which rides in a skewed slot 12. The pin 11, as thus described functions as a spring loaded positive position lock 4 keeping the tool 50 in the open position. Pressure on the push button 13 releases the spring lock 4 enabling the tool 50 to close to its folded or closed position shown in FIG. 1. Friction/tension is maintained constantly by spring 16 to provide a controlled motion of the members 7, 8 and 9 to prevent them from free falling.

Figure 3A:
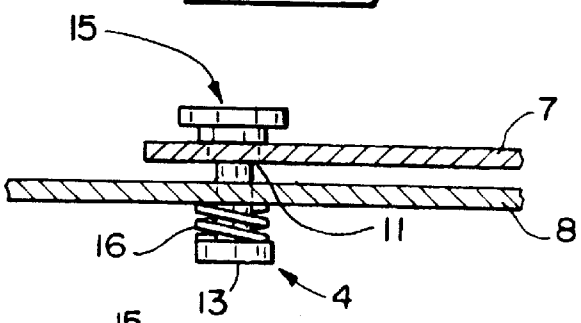
FIG. 3a is an enlarged cross-sectional view of the rivet locking mechanism in an open position and FIG. 3b shows the rivet mechanism in a locked position; and, FIG. 4a shows the washer portion of the rivet
Figure 3B:
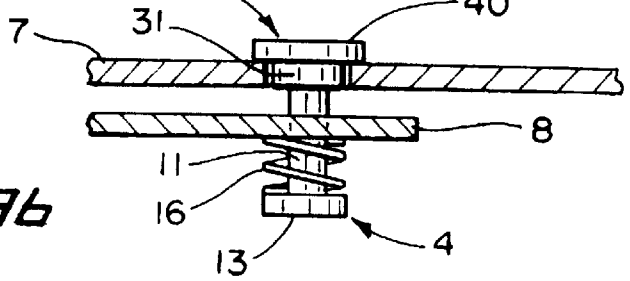

The pin 11 which rides in the slot 12 is a two piece internal rivet with a push button head 13 at one end and a washer 15 affixed to the other end. The washer 15 has downwardly extending walls 26 with a central recess 27 within which the cylindrical walls 28 of the push-button rivet 29 are mounted. The washer head 16 includes an enlarged circular top 40 joined to an intermediate portion 31 of lesser diameter which engages the semi-circular aperture [50] *30*. The member 7 includes a notch 16 which the pin 11 engages preventing the tool 50 from over closing or opening in the wrong direction. The slot 12 in the member 7 is skewed at an angle relative to the edges of the member 7. At the end of the slot 12, the spring 16 pulls the post pin 11 into a semicircular hole thereby creating a positive lock such as shown in FIG. 3b. The pin 11 is shown in an open position in FIG. 3a.

As a further advantage, the hole [5] *30* maintains the tool 50 in a proper locked position even if the forward portion of the hole [5] *30* becomes distorted due to repeated usage.

In the preferred embodiment the members 7, 8 and 9 are of elongated rectangular bar stock approximately ⅛ inch thick by 2 inches wide. As mentioned often the legs 7, 8 and 9 are 3, 4 and 5 feet long respectively which creates a right angle in the open position in order to layout perpendicular lines.

Figure 6:
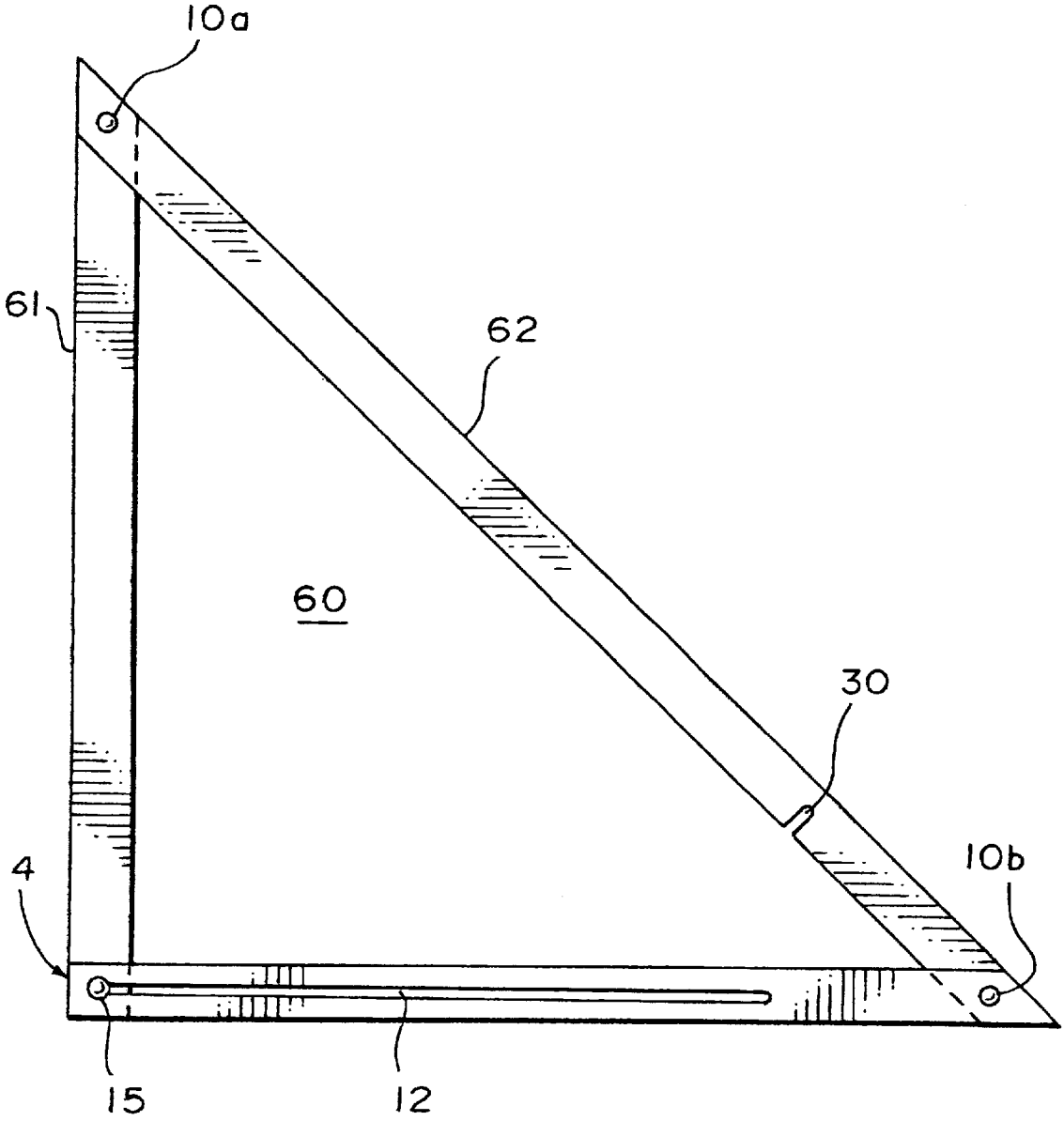

It is within the scope of the invention to make an assortment of sizes and models of this tool 50, all of which retain the ratio of 3-4-5 triangle. It is also possible to use the teachings of this invention with an isosceles triangle *60* which has two 45° angles and a 90° angle, *such as shown in FIG. 6*.

While the invention has been explained by a detailed description of certain specific embodiments, it is understood that various modifications and substitutions can be made in any of them within the scope of the appended claims which are intended also to include equivalents of such embodiments.

What is claimed is:

1. A triangular layout device for right angles comprising:

a first elongated member having a substantially rectangular shape, a first end and a second end each having an aperture extending therethrough, and a slot extending from the first end aperture along the first member in a skewed direction with respect to the axis of the member;

a second elongated member having a substantially rectangular shape, a first end and a second end each having an aperture extending therethrough;

a third elongated member having a substantially rectangular shape, a first end and a second end each having an aperture extending therethrough;

a first pivot pin engaging the apertures in the first end of the second and third elongated members, a second pivot pin engaging the apertures in the second end of the first and the second end of the third elongated members and a third spacing loaded pin engaging the apertures in the first end of the first member and the second end of the second member, said spring loaded pin being slidable along the slot to collapse the triangular device into a configuration with the members lying in substantially the same vertical plane; and, wherein the first, second, and third elongated members have a length relationship ratio of 3:4:5.

2. A triangular layout device for right angles in accordance with claim 1 wherein:

the third member includes a notch along the interior side thereof to engage the spring loaded pin limiting the pivotal movement of the first member when the device is collapsed.

3. A triangular layout device for right angles in accordance with claim 2 wherein:

the slot includes a semi-circular aperture at one end in the first member to be engaged by the spring loaded pin locking the device in an open position.

4. A triangular layout device for right angles in accordance with claim 2 wherein:

the spring loaded pin comprises a locking mechanism wherein the pin includes a push button head at one end, an elongated shank and a coiled spring wrapped thereabout engaging the first member, and a washer at the other end having an elongated shank with an axial recess mounted over the first shank wherein the push button head lock the washer in the central aperture.

5. A triangular layout device for right angles in accordance with claim 4 wherein:

the pin further includes a washer having a head with an enlarged outer portion and a smaller inner portion which engages the semi-circular aperture to lock the pin therein under spring pressure.

6. A triangular layout device for right angles in accordance with claim 2 wherein:

the first, second and third members are respectively 3, 4 and 5 feet in length.

7. A triangular layout device for right angles in accordance with claim 1 wherein:

the first, second and third pivot pins comprise rivets.

8. A triangular layout device for right angles comprising:

a first elongated member having a substantially rectangular shape, a first end and a second end each having an aperture extending therethrough, and a slot extending from the first end aperture along the first member in a skewed direction with respect to the axis of the member;

a second elongated member having a substantially rectangular shape, a first end and a second end each having an aperture extending therethrough;

a third elongated member having a substantially rectangular shape, a first end and a second end each having an aperture extending therethrough;

a first pivot pin engaging the apertures in the first end of the second and third elongated members, a second pivot pin engaging the apertures in the second end of the first and the second end of the third elongated members and a third spring loaded pin engaging the apertures in the first end of the first member and the second end of the second member, said spring loaded pin being slidable along the slot to collapse the triangular device into a configuration with the members lying in substantially the same vertical plane; and wherein, the first and second elongated members are equal in length forming, an isosceles triangle with the third elongated member.

*9. A triangular layout device, comprising:*

*a first elongated member having a first end and a second end, each having an aperture extending there through;*

*a second elongated member having a first end and a second end, each having an aperture extending there through;*

*a third elongated member having a first end and a second end, each having an aperture extending there through;*

*a first pivot pin engaging the apertures of the first end of the first elongated member and the second end of the third elongated member;*

*a second pivot pin engaging the apertures of the first end of the second elongated member and the second end of the first elongated member;*

*a third pivot pin engaging the apertures of the first end of the third elongated member and the second end of the second elongated member;*

*wherein the device is selectively arranged in an open configuration and a folded configuration while maintaining the engagement of each of the pivot pins with the respective elongated members, the device in the folded configuration having each of the elongated members lying in substantially the same vertical plane;*

*and wherein the device is capable of moving from the folded configuration to the open configuration to form a triangular layout device wherein the device locks such that two of the elongated members automatically form a 90 degree angle.*

*10. The triangular layout device in accordance with claim 9, wherein the first, second and third elongated members have a length relationship of* 3:4:5.

*11. The triangular layout device in accordance with claim 9, wherein the lengths of two of the first, second and third elongated members are substantially equal.*

*12. A layout device, comprising:*

*a plurality of elongated members, each having a respective first end and a second end, each elongated member being engaged to an adjacent elongated member, wherein the device is selectively arranged in an open configuration and a folded configuration while maintaining the engagement of each of the elongated members, the device in the folded configuration having the members lying in substantially the same vertical plane, and wherein the device is capable of moving from the folded configuration to the open configuration to form a triangular layout device wherein the device locks such that two of the elongated members automatically form a 90 degree angle.*

*13. The layout device according to claim 12, wherein device in the open configuration comprises a 3-4-5 triangle.*

*14. The layout device according to claim 12, wherein the length of two of the elongated members is substantially equal.*

*15. A layout device, comprising:*

*a plurality of elongated members, each having a respective first end and a second end, each first end of each elongated member being engaged to the second end of an adjacent elongated member, wherein the device is selectively arranged in an open configuration defining a triangular structure and a folded configuration with the members lying substantially parallel in a linear direction while maintaining the engagement of each of the elongated members, and wherein the device is capable of moving from the folded configuration to the open configuration to form a triangular layout device wherein the device locks such that two of the elongated members automatically form a 90 degree angle.*

*16. The layout device according to claim 15, wherein the device in the open configuration comprises a 3-4-5 triangle.*

*17. The layout device according to claim 15, wherein the length of two of the elongated members is substantially equal.*

*18. A triangular layout device, comprising:*

*a first elongated member having a first end and a second end;*

*a second elongated member having a first end and a second end, the first end of the second elongated member being engaged to the second end of the first elongated member;*

*a third elongated member having a first end and a second end, the first end of the third elongated member being engaged to the second end of the second elongated member, the second end of the third elongated member being engaged to the first end of the first elongated member;*

*wherein the device is selectively arranged in an open configuration and a folded configuration while maintaining the engagement of each of the elongated members, the device in the folded configuration having the first, second and third elongated members lying in substantially the same vertical plane, and wherein the device is capable of moving from the folded configuration to the open configuration to form a triangular layout device wherein the device locks such that two of the elongated members automatically form a 90 degree angle.*

*19. The triangular layout device according to claim 18, wherein the first, second and third elongated members have a length relationship of 3:4:5.*

*20. The layout device according to claim 18, wherein the length of two of the elongated members is substantially equal.*

*21. A triangular layout device, comprising:*

*a first triangle leg having a first end and a second end;*

*a second triangle leg having a first end and a second end, the first end of the second leg being pivotably engaged to the second end of the first leg;*

*a third triangle leg having a first end and a second end, the first end of the third leg being engaged to the second end of the second leg, the second end of the third leg being engaged to the first end of the first leg;*

*wherein the device is selectively arranged in a fully open configuration and a folded configuration while maintaining the engagement of each of the legs, the device in the folded configuration having the first, second and third legs lying in substantially the same vertical plane, and wherein the device is capable of moving from the folded configuration to the fully open configuration to form a triangular layout device wherein the device locks such that two of the legs automatically form a 90 degree angle when the device is in the fully open configuration.*

*22. The layout device as specified in claim 21 wherein the first and second legs are joined by a first pivot pin to form the 90 degree angle in the fully open configuration, wherein the second leg first end includes a slot extending to a midsection of the second leg.*

*23. The layout device as specified in claim 22 wherein the third leg includes a locking mechanism cooperating with the first pivot pin in the folded configuration.*

* * * * *